United States Patent Office 2,870,203
Patented Jan. 20, 1959

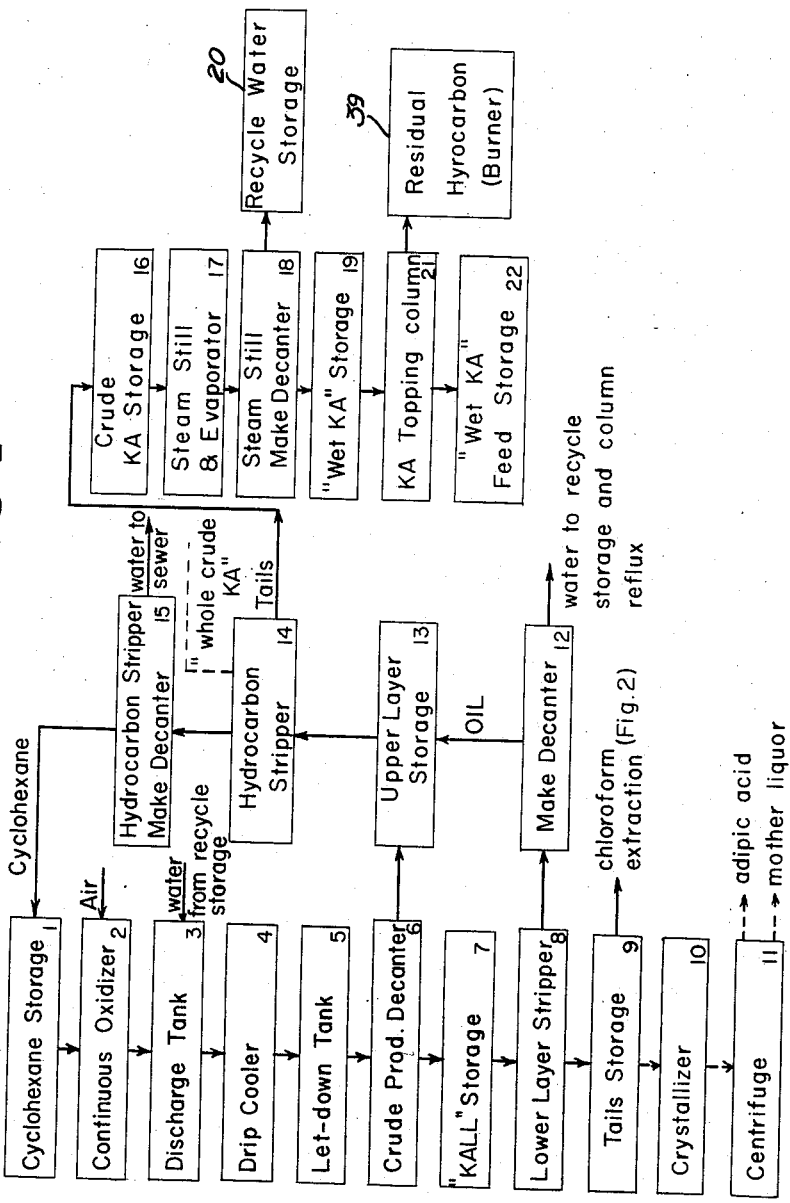

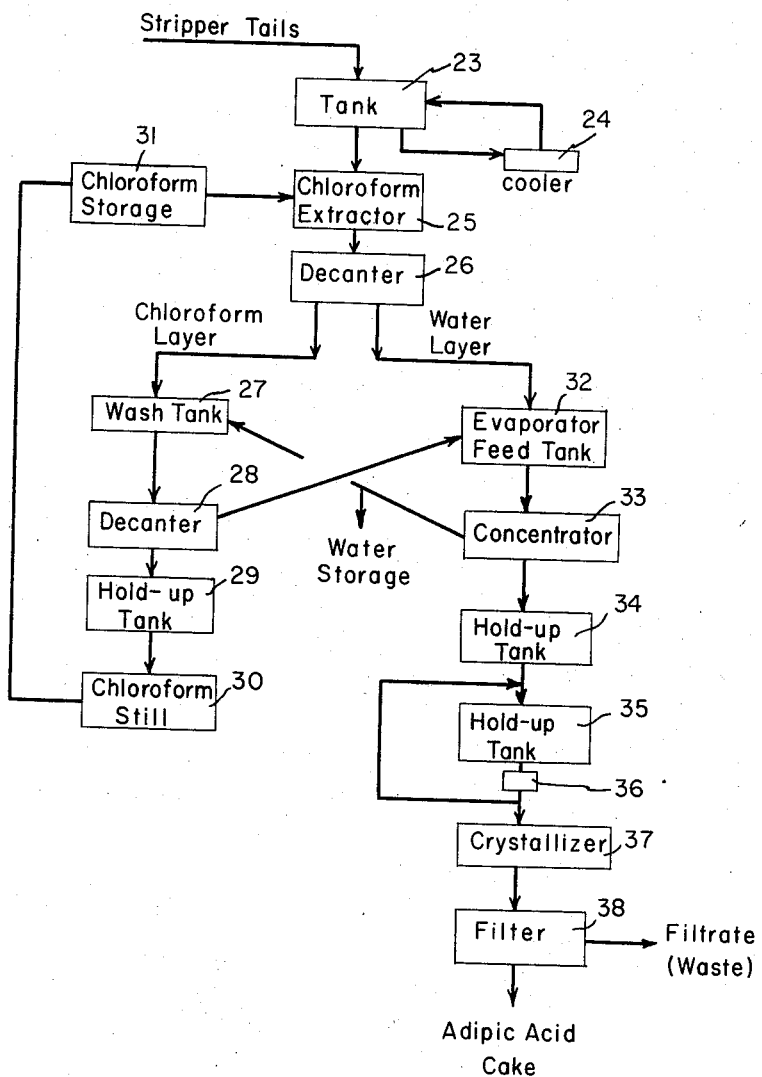

2,870,203

CHLOROFORM EXTRACTION PROCESS FOR IMPROVING RECOVERY OF ADIPIC ACID

Alexander Davenport Cyphers, Jr., Charleston, W. Va., and Alfred Arthur Gruber, Orange, Tex., assignors to E. I. du Pont de Nemours and Company, Wilmington, Del., a corporation of Delaware Application May 19, 1955, Serial No. 509,492

3 Claims. (Cl. 260—537)

This invention relates to improvements in the recovery of adipic acid from certain oxidation products derived from cyclohexane. These improvements are directed particularly to the process which involves oxidation of cyclohexane with molecular oxygen (e. g. air) to primary oxidation products (cyclohexanol, cyclohexanone, and peroxides) and relatively minor quantities of dibasic acids.

The liquid phase air oxidation of cyclohexane to primary products is described in U. S. Patent 2,223,494. A preferred method for carrying out the said oxidation is to inject air into the hydrocarbon containing a few parts per million of catalyst such as cobalt naphthenate while maintaining the pressure high enough to keep the hydrocarbon largely in the liquid phase. The optimum conversion in large scale operations is about 10 to 12%. The process is carried out in a continuous manner. Crude reaction product is continuously withdrawn from the oxidizer. This crude product contains cyclohexanol ("A"), cyclohexanone ("K"), and about 0.1 pound of adipic acid per pound of K+A (i. e., "KA"). Various other products are present in smaller quantity. This entire oxidizer effluent is treated with water to prevent crystallization of the adipic acid. The aqueous phase is known as the KA lower layer ("KALL"), and contains approximately 90% of the adipic acid formed during the air oxidation of cyclohexane, together with water-soluble oxygenated by-products and a small quantity of K and A. In the process as practiced heretofore, the KALL was sent to a stripping column to recover K and A overhead and to give a tails stream known as the "KALL stripper tails." The KALL and KALL stripper tails constituted a source of adipic acid to which the present invention is directed.

The present invention provides an improvement whereby the adipic acid which is formed in the oxidation of cyclohexane or primary oxidation products thereof, is recovered with greater efficiency than heretofore.

It has been recognized heretofore that the dibasic acids which are formed along with cyclohexanol and cyclohexanone in the liquid phase air oxidation of cyclohexane to primary products can be separated from each other by use of selective solvents. Methods which have been tried in the past include selective extraction of glutaric acid from the non-volatile residue (after removal of cyclohexanol and cyclohexanone) by means of boiling benzene (solubility of glutaric acid exceeds 10%, while the solubility of adipic acid is only 0.06%), coupled with extraction of adipic acid in boiling xylene (solubility exceeds 17%), succinic acid being only very slightly soluble in each of these boiling solvents (0.01% in boiling benzene and 0.142% in boiling xylene). Fractional crystallization, and partition chromatography (using water-silicic acid as a stationary phase and n-butanol-chloroform as a mobile phase) have been investigated with fairly good success. However, these methods are not as simple and inexpensive as would be desired in a case such as this, where the cost of separation of pure adipic acid must be compared economically with the cost of making it by oxidation of cyclohexanone, or KA. The previously known selective extraction methods for separating adipic acid from KALL stripper tails have not heretofore proved to be sufficiently attractive from the comparative economic standpoint to justify their adoption.

A partial recovery of adipic acid from KALL stripper tails has been achieved heretofore by direct crystallization. In that process the presence of a non-volatile residue ("NVR") in the stream solubilizes the adipic acid, and this results in low recoveries. Moreover, it has been found that the elevated temperatures required in this process produce chemical losses of the adipic acid initially present.

An object of the present invention is, therefore to provide further improvements in methods for separating adipic acid from the products formed in the oxidation of cyclohexane to primary products.

The present invention is based in part upon the discovery that in processes of the type hereinabove mentioned chloroform extraction of the KALL (hereinabove described) removes a part of the above-mentioned NVR materials, leaving a partially purified aqueous solution from which adipic acid readily crystallizes.

The process of this invention can be practiced by subjecting the KALL stream to continuous extraction with chloroform, preferably using a countercurrent flow of the chloroform layer through a series of packed towers. The ingredients which are extracted by the chloroform are, fortuitously, those which interfere with the crystallization of adipic acid. Since the KALL contains an amount of adipic acid equal to from 7 to 11% of the total K and A produced, and since the efficiency of the recovery is raised, by chloroform extraction, to about 55%–65% (from 30%–40% in the absence of chloroform extraction), it has ben clearly established that the extraction step produces a substantial improvement in the production of adipic acid in commercial plants for manufacture of KA and adipic acid.

In one embodiment, the KALL stripper is operated so as to recover overhead only cyclohexane (which is present in small quantity), and no effort is made to strip the KALL of steam-volatile organic oxygenated materials. In another embodiment the KALL stripper is operated so as to collect overhead all of the steam-volatile components. In still another embodiment the total KALL, unstripped, is used. Of these three embodiments, the most preferred is the first, namely that in which the stripper is operated for topping of cyclohexane only.

Fig. 1 illustrates the liquid phase air oxidation of cyclohexane by a process in which the cyclohexane is pumped from the cyclohexane storage supply 1 through three stirred autoclave-oxidizers in series, equipped with reflux condensers for water take-off 2, and into the discharge tank 3, a sufficient amount of water being injected to prevent plugging of the lines with water soluble solid, thence through coolers 4 to a let-down tank 5 and a decanter 6 wherein the oil layer is permitted to separate from the aqueous layer. The latter is sent to a storage tank 7, from which it is withdrawn to a stripper 8 which quickly distills cyclohexane and, if desired, other steam-volatile ingredients. The stripper residue is conducted to storage tank 9 from which it can be withdrawn for chloroform extraction as set forth in Figure 2. The drawing also shows the crystallizer 10 where said tails can be cooled to produce adipic acid crystals, and the centrifuge 11 which produces adipic acid and mother liquor. The latter two operations are not conducted during periods when all of the stripper tails are subjected to chloroform extraction. The steam volatile ingredients from the continuously operated stripper 8 (aqueous phase being returned to the stripper) are conducted through another decanter 12 to a storage vessel 13 where it is admixed with the oil layer from decanter 6. In preferred operations the water content of the stripper tails is lowered to about 45%–50% in the stripper 8. The oil layer from the storage vessel 13 is fed to a hydrocarbon stripper 14 which removes wet cyclohexane and none of the higher boiling organics, the latter remaining behind with condensed steam as single phase distillation residue. The wet cyclohexane is decanted in the decanter 15, and the recovered cyclohexane is returned to the hydrocarbon storage 1. The "KALL" stripping 8 tails from the stripper 14 are converted to a refined adipic acid precursor, "Wet KA." To do this, the distillation residue from the stripper 14 is withdrawn and sent to storage 16. This oil is subjected to steam distillation with the water phase continuously returned to the still 17. The oil phase (i. e. "Wet KA") in the distillate is decanted 18 and conducted to the "Wet KA" storage vessel 19, the water layer being recycled to the still through a storage vessel 20. The "Wet KA" is passed through a topping column for production of a very small amount of hydrocarbon-water distillate 21. This is merely a safety precautionary measure to remove any traces of hydrocarbon which may be present as contamination, the purpose of the topping being to eliminate any hazard from a contact of gaseous hydrocarbon with nitric fumes, since the "Wet KA," in preferred operations, is later converted to adipic acid by nitric acid oxidation as described in U. S. Patent 2,703,331. The traces of hydrocarbon thus recovered are sent to the waste burner 39. The topped "Wet KA" is conducted to the storage vessel 22.

In the process just described the cyclohexane oxidation can be carried out at temperatures between 50° and 175° C., under a pressure between 50 and 250 pounds per square inch. The percentage conversion of cyclohexane for practical results is kept within the range of about 5% to 30%. The oxidation catalyst is preferably a cobalt salt such as cobalt naphthenate, and the quantity of catalyst may be from 0.1 to 1000 parts per million parts of cyclohexane; however, it is not absolutely essential that any catalyst of any kind be introduced. The preferred temperature is about 145° to 150° C.

Figure 2 illustrates the chloroform extraction plant. The tails from the storage tank 9 (cf. Figure 1) are cooled to below the boiling point of chloroform (suitably to 45°–50° C.) in a vessel 23 which is equipped with a cooler 24, and thence conducted to an extractor (or series of extractors operated countercurrently) 25 into which is also fed chloroform. The quantity of chloroform fed into the extraction unit 25 is not highly critical, but is suitably about one pound for every two pounds of the KALL composition fed. The extractor contents are transferred to a decanter tank 26 which produces a water layer and a chloroform layer. The chloroform layer is conducted to a wash tank 27, the contents of which are thereafter transferred to a decanter 28. From the decanter the chloroform layer passes to a hold-up tank 29 and thence to the recovery still 30, which feeds the chloroform storage vessel 31. The recovered chloroform contains the K and A which is not removed in the stripper 8 of Figure 1. Thus the recovered chloroform may have a density of 1.40–1.45, as compared with 1.48 for the original material. Only trace amounts of other oxygenated materials are present. The build-up of K and A in recovered chloroform is low enough to cause no difficulty. The water layer from the decanter tank 26 and the water layer from the decanter 28 are sent to an evaporator feed tank 32, the contents of which are conducted to a concentrator 33 wherein water is reduced to below about 20% of the weight of concentrator effluent. This concentrator operates preferably at subatmospheric pressure, since concentration at atmospheric pressure caused rather serious chemical loss of adipic acid. When the final temperature in the concentrator is held to 80° C. or less, this loss of adipic acid can be reduced to 3% by "vacuum" concentration (20% water content in the effluent). At somewhat lower water contents, and somewhat higher temperatures, the adipic acid loss is higher (e. g. about 10%). The water recovered from the concentrator as distillate is sent to the wash tank 27. The concentrated effluent from the concentrator is conducted to a hold-up tank 34, thence to a crystallizer feed hold-up tank 35, which feeds, through a crystallizer feed cooler 36, to one or more crystallizers which are cooled to about room temperature or below. This cooler can also be used to cool the contents of the crystallizer feed tank 35. Suitably three of these crystallizers are employed and the slurry from these feed two others operated at cooler temperature, limited of course by the freezing point of the liquid phase. The resulting slurry is fed to a rotary filter 38 which has provision for water wash, and which produces an adipic acid cake. The filtrate from this unit may be evaporated and disposed of as waste. The adipic acid cake is preferably combined with one or more other sources of crude adipic acid, and subjected to further refining, in the known manner.

The process of this invention is of course not limited, in its useful applications, to those processes in which cyclohexane is oxidized at low conversion to KA as the principal product. It is equally valuable in connection with processes in which adipic acid is the principal cyclohexane oxidation product, as described in U. S. Patent 2,223,493, and in processes wherein the KA is produced as hereinabove described, after which the A is dehydrogenated to K in the known manner (U. S. Patent 2,015,751) and the K is thereupon oxidized to adipic acid as described in U. S. Patents 2,005,183, or 2,316,543. Any adipic acid-containing residues, having glutaric acid, succinic acid, and/or the other non-volatile components which are formed by air oxidation of cyclohexane or its primary oxidation products such as cyclohexanol, cyclohexanone, or cyclohexyl hydroperoxide, and which interfere with the purification of adipic acid by crystallization from water, can be extracted with chloroform, as described herein, to improve the recovery of adipic acid.

The invention is illustrated further by means of the following example:

*Example*

Cyclohexane was oxidized in a continuous manner with air, at a temperature of 145°–155° C. under a pressure of 130 pounds per square inch (gauge), using the equipment illustrated in Figure 1. The cyclohexane contained a few parts per million of cobalt naphthenate. The air/cyclohexane ratio in the feed was 0.8 to 0.9 (expressed in terms of thousands of cubic feet of air per hour divided by the rate of feed of cyclohexane, expressed in gallons per minute). About 9 to 10% of the cyclohexane was oxidized. The composition of the KALL was as follows: Steam volatiles, ca. 10%; water, 50%, adipic acid ca. 11%; non-volatile by-products, ca. 29%. The KALL was conducted through a stripper which removed steam distillables to 0.1%. This caused degradation of adipic acid, amounting to about 8% of the adipic acid present. The stripping column used in this operation was packed with stainless steel rings. The KALL stripper tails were brought to a temperature of 45° to 50° C., and fed batchwise, in 10,000 pound batches, to an extraction tank and subjected to the process steps set forth in Figure 2. The water content of the extractor feed was 45 to 50%. The temperature was held at 47° C. ±2° C. The KALL/chloroform weight ratio was 2/1; mixing time was 15 minutes and decanting time was 5 to 15 minutes. In the washing step the wash water/extract weight ratio was 1/1, and the mixing time was 15 minutes. The concentrator (33, Figure 2) was operated batchwise at atmospheric pressure using 7000 pound batches, a steam heater (30 pounds per square inch) being used for heat input. The final temperature of the concentrate was 108° C., and the water content of the concentrate was about 20 to 21%. The weight of concentrator tails from 10,000 pounds of stripped KALL feed was 5000 pounds. The adipic acid content of the mixture was 21.6%, and the content of non-volatile by-products was 57.3%. When this mixture was sent through the crystallizers as hereinabove described, a thick adipic acid cake having an adipic acid content of 60% by weight was readily obtained. The slurry filtered more rapidly, and yielded thicker cake, than the corresponding slurry produced from stripped KALL without chloroform extraction. The quantity of adipic acid in the cake was about 65% of the quantity initially present in the KALL; in contrast with this, cake correspondingly produced without chloroform extraction contained only about 30% to 40% of the adipic acid in the KALL processed. The adipic acid saved, by introducing the chloroform extraction step, was about 500 pounds per 10,000 pounds of feed processed.

It is to be understood that the example hereinabove illustrated can be varied to meet particular circumstances which may prevail in any individual plant. For example, water contents of 40% and less in the extractor feed cause relatively slow separation of phases in the decanter tanks, hence if it is desired to increase rate of separation at this stage of the process, one way by which this can be done is to employ a somewhat higher water content in the feed. Troublesome formation of emulsion at the interface is more frequently encountered at low cyclohexane oxidation conversions (8%) than at somewhat higher conversion levels. As hereinbefore indicated the stripping column can be substituted by a cyclohexane topping still, with advantageous results (lower stripping losses), and in that embodiment KA can be recovered from the chloroform layer before recycling chloroform if desired. These various modifications, and others, result in further incremental improvements or advantages beyond what is illustrated in the foregoing example.

It is to be understood also that while the embodiments of the invention hereinabove described are the ones which are best employed in connection with processes for improving adipic acid recovery in commercial operations based on converting cyclohexane to KA, the invention may also be used in recovery of adipic acids from mixtures produced from various sources; for example, a glutaric-succinic-adipic mixture from a plant for converting cyclohexanone to adipic acid (such as may be recovered by evaporating the mother liquor obtained in recrystallization of crude adipic acid produced in such a plant), can be combined with the mixtures hereinabove specifically illustrated, to provide additional feed for the chloroform extractor. Combined feeds of this general sort are frequently highly advantageous.

The invention is, accordingly, useful not only in increasing the production of adipic acid in plants designed for production of KA as the major product, but in increasing production of adipic acid in plants designed for converting such intermediates as cyclohexanone or the like to adipic acid as a main product.

What is claimed is the following:

1. The process which comprises extracting, with chloroform, crude aqueous adipic acid produced by oxidation of a member of the class consisting of cyclohexane and cyclohexanone with molecular oxygen in the liquid phase, said aqueous adipic acid containing succinic acid and glutaric acid, formed in the said oxidation, which keep the said adipic acid in solution, and interfere with the crystallization of adipic acid therefrom, until said products of the said oxidation which interfere with the said crystallization are removed by the chloroform, and aqueous adipic acid having a lower content of such interfering materials is obtained.

2. The process for manufacturing adipic acid from cyclohexane oxidation products, obtained by oxidizing cyclohexane in the liquid phase to primary oxidation products comprising chiefly cyclohexanol and cyclohexanone, with molecular oxygen, which comprises injecting water into the effluent from a liquid phase cyclohexane oxidation reaction vessel, separating the hydrocarbon and aqueous phases in the resulting mixture, and concentrating the said aqueous phase at subatmospheric pressure, extracting from the resulting aqueous mixture, with chloroform, oxidation products, comprising succinic and glutaric acids, which interfere with crystallization of adipic acid from water, and thereafter recovering adipic acid from the resulting extracted mixture.

3. Process of claim 2 wherein the liquid phase oxidation of cyclohexane with molecular oxygen is carried out at a temperature between 50° and 175° C. under a pressure of 50 lbs. and 250 lbs. per square inch, the oxidation is continued until the conversion of cyclohexane is within the range of from 5% to 30%, the water content of the mixture subjected to chloroform extraction is not less than 40% by weight, and the temperature of the chloroform during extraction is from 45 to 49° C.

References Cited in the file of this patent

UNITED STATES PATENTS 2,703,331     Goldbeck et al. _____ Mar. 1, 1955